United States Patent [19]
Kraus

[11] Patent Number: 5,499,737
[45] Date of Patent: Mar. 19, 1996

[54] RETAINER PLUG

[75] Inventor: Willibald Kraus, Grunstadt, Germany

[73] Assignee: TRW United Carr GmbH & Co. KG, Enkenbach-Alsenborn, Germany

[21] Appl. No.: 249,846

[22] Filed: May 26, 1994

[30] Foreign Application Priority Data

Jun. 3, 1993 [DE] Germany .......................... 43 18 534.7

[51] Int. Cl.⁶ .................................................. B65D 39/00
[52] U.S. Cl. ........................... 220/307; 215/357; 138/89
[58] Field of Search .................................. 220/241, 242, 220/307; 215/247, 320, 355, 357, DIG. 3; 138/89, 89.2

[56] References Cited

U.S. PATENT DOCUMENTS

| 3,168,209 | 2/1965 | Brookins ................................... 138/89 |
| 4,572,390 | 2/1986 | Grittmann ................................. 220/307 |
| 4,761,319 | 8/1988 | Kraus ...................................... 220/307 |

FOREIGN PATENT DOCUMENTS

| 497960 | 11/1953 | Canada ................................... 220/307 |
| 544054 | 6/1993 | European Pat. Off. . |
| 2090519 | 1/1972 | France . |
| 2517385 | 12/1982 | France . |
| 249329 | 9/1966 | Germany . |
| 1930682 | 1/1970 | Germany ................................ 138/89 |
| 2537368 | 2/1977 | Germany . |

*Primary Examiner*—David Scherbel
*Assistant Examiner*—Randall E. Chin
*Attorney, Agent, or Firm*—Fay, Sharpe, Beall, Fagan, Minnich & McKee

[57] ABSTRACT

The invention relates to a retainer plug 1 formed of plastic and having a bolt-like basic body 2 and a cover flange 3. The basic body 2 includes at least two stop elements 8, 9, 10, 11 arranged on the circumference of the basic body (2) at a distance spaced from the cover flange 3. The basic body 2 has an open design at the end opposite the cover flange 3 and the stop elements have a cross-piece-like shape, with a starter ramp 17, a middle area 18 that extends parallel to the basic body 2, and a stop ramp 19 that faces the underside of the cover flange 3. Additionally, the cover flange is equipped above the respective stop ramp 19 with a continuous recess 12, 13, 14, 15 which extends through the wall 16 of the basic body 2 to a point between the cover flange and the stop elements.

9 Claims, 3 Drawing Sheets

RETAINER PLUG

BACKGROUND OF THE INVENTION

The subject invention is directed to a retainer plug made of plastic having a bolt-like basic body and a cover flange with the basic body including at least two longitudinally extending, pleat-like, pulled-in areas, between which there are arranged stop elements located on the circumference of the basic body at a location spaced from the cover flange.

Retainer plugs of this general type are already known in the prior art (see, for example, German Printed Application 2 537 368). These prior plugs are designed in such manner that two opposite pleat-like areas extend alongside a basic body that is closed at the lower end. Between the two pulled-in areas there are stop elements, each in the form of an edge, that run conically toward the closed lower end of the basic body. Because of this constructive design, the arrangement is relatively rigid and inflexible so that a significant effort is required for installation. Disassembly is likewise correspondingly difficult.

In contrast, the object of the subject invention is to create a retainer plug of the above-mentioned type that is of simple construction and can be installed with low expenditure of force but which, on the other hand, produces after installation a secure seat in an aperture of a support.

SUMMARY OF THE INVENTION

This task is solved according to the invention in that the basic body is designed open at the end opposite the cover flange with the stop elements having a cross-piece-like shape, with a starting ramp, a middle area that extends parallel vis-a-vis the basic body, and a stop ramp that faces the underside of the cover flange. The cover flange is equipped in the area above the respective stop ramp, with a continuous recess that runs through the wall to a point below the cover flange but spaced from the stop elements. This results in the advantage of having a basic body of the retainer plug that is highly flexible and which can be inserted without much difficulty into an aperture of a support while still assuring functionally safe mounting.

In accordance with a more limited aspect of the invention, the depth of the recess is less than the distance between the underside of the cover flange and the stop ramp, so that despite excellent flexibility, the unit remains sturdy. In addition, the width of the recess in the cover flange can be greater than the width of the subjacent stop element, so that excellent elasticity is achieved with adequate holding effect.

According to another aspect of the invention, the basic body can have the shape of a cylinder with four diametrically opposed, pleat-like, pulled-in areas, between which there are four stop elements located on the circumference. The pleat-like, pulled-in areas can each be designed in the shape of a "U".

In further aspect of the invention, the open end of the basic body can be of conically tapered shape, and the end areas of the pleat-like, pulled-in areas can project from the end areas of the smooth circumference of the basic body. Thus, in simple fashion, there is produced an excellent installation aid during insertion of the retainer plug into a support aperture and/or into two superposed apertures of two different supports.

The width of the area of the smooth circumference of the basic body is wider than the adjacent, pleat-like, pulled-in area. The respective stop element can be arranged in the center of the respective area of the smooth circumference of the basic body.

With respect to the design of the cover flange, it can have a centrally located dish-like pulled-in area on the top. Alternatively, there may be arranged, above the cover flange, at least one attachment element for connecting to and/or supporting various components such as tubes, wires, or the like. Thus, the retainer plug according to the invention is designed for a broad application range.

Alternatively, the initially-mentioned task is solved in that the pleat-like, pulled-in areas are formed as at least three axially extending, open recesses distributed over the circumference of the basic body and separated from each other by walls. The stop elements can have the shape of cross-pieces, with a start-up ramp, a middle area that runs parallel to the basic body, and a stop ramp facing the underside of the cover flange. The basic body can be connected with the cover flange via cross-pieces. As a result of this alternative design, there is produced the benefit of a highly elastic basic body that can be installed without difficulties in an aperture of a support and fastens in a functionally secure manner.

Beneficial further refinements of this design form are apparent from the additional subclaims.

BRIEF DESCRIPTION OF THE DRAWINGS

The above and other objects and advantages will become apparent from the following description when read in conjunction with the accompanying drawings wherein.

DETAILED DESCRIPTION OF THE PREFERRED AND ALTERNATE EMBODIMENTS

Referring more particularly to the drawings wherein the showings are for the purpose of illustrating preferred embodiments of the invention only and not for the purpose of limiting same, a first embodiment of the retainer plug of the invention is generally represented in FIGS. 1–5 and is made of plastic with a bolt-like, cylindrical basic body 2 and a cover flange 3.

Figure 3:
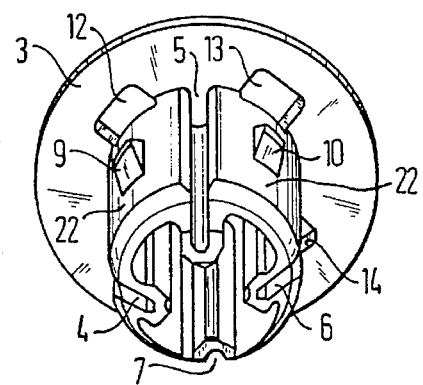
FIG. 3 is a perspective view from below of the retainer plug of FIG. 1.
Figure 5:
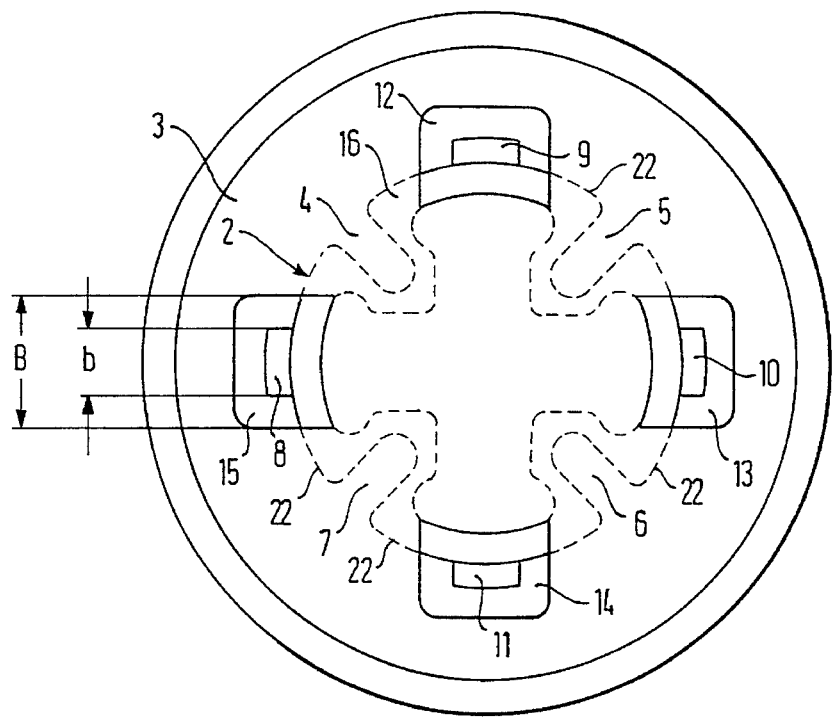
FIG. 5 is a top plan view of the retainer plug of FIG. 1.

The basic body 2 has, as best seen in FIGS. 3 and 5, four longitudinally extending, pleat-like, pulled-in areas 4, 5, 6, and 7 which, according to FIG. 5, are approximately shaped in the form of a "U". Moreover, the basic body 2 is hollow and open at the lower end opposite the cover flange 3.

Between the pleat-like, pulled-in areas 4, 5, 6, and 7 there is respectively located a smooth circumference 22 of the cylindrically designed basic body 2. On the smooth circumference 22, there are arranged stop elements 8, 9, 10, and 11. According to FIG. 4, the stop elements have a shape like a cross-piece with a start-up ramp portion 17, a middle area 18 that extends generally parallel to the basic body 2, and with a stop ramp 19 facing the underside of the cover flange 3 in opposing relationship thereto.

It is clearly apparent from FIGS. 3 and 5 that the cover flange is provided in the area above each respective stop ramp 19 with recesses 12, 13, 14, and 15 that extend downwardly and intersect the wall 16 of the basic body 2 down to a point below the cover flange 3. As a result of these recesses, there is produced, according to the invention, in the area above each respective stop ramp 19, increased flexibility of the retainer plug 1.

Figure 1:
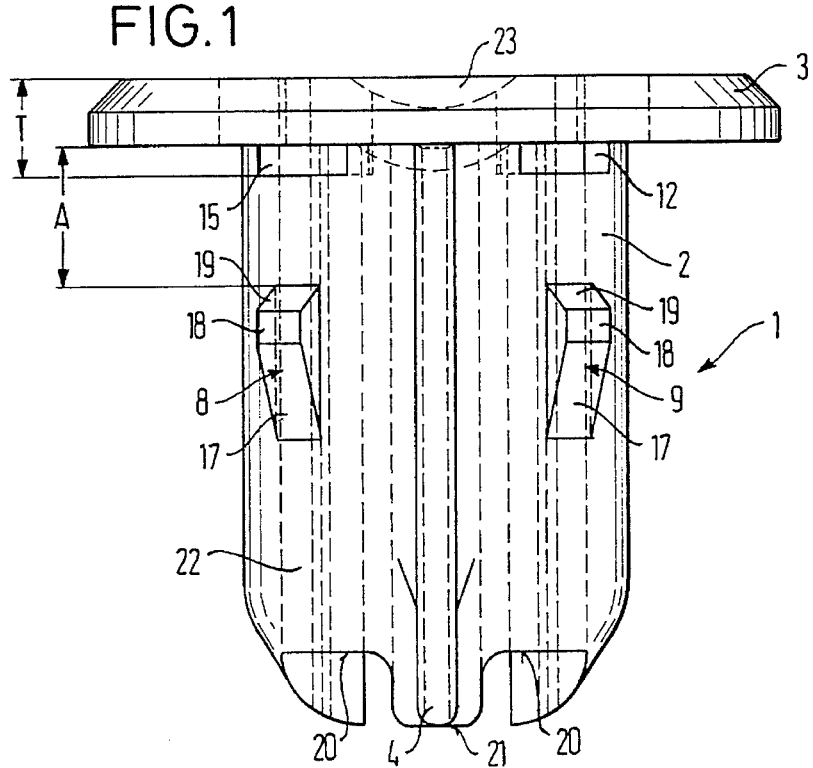
FIG. 1 is a side view of a preferred embodiment of the retainer plug according to the invention.

According to FIG. 1, the depth "T" of the recesses 12, 13, 14, and 15 is less than the distance A between the underside of the cover flange 3 and the respective stop ramp 19. It is apparent from FIG. 5 that, in addition, the width B of the respective recesses 12, 13, 14, and 15 in the cover flange 3 is greater than the width b of the subjacent stop elements 8, 9, 10, and 11.

Figure 4:
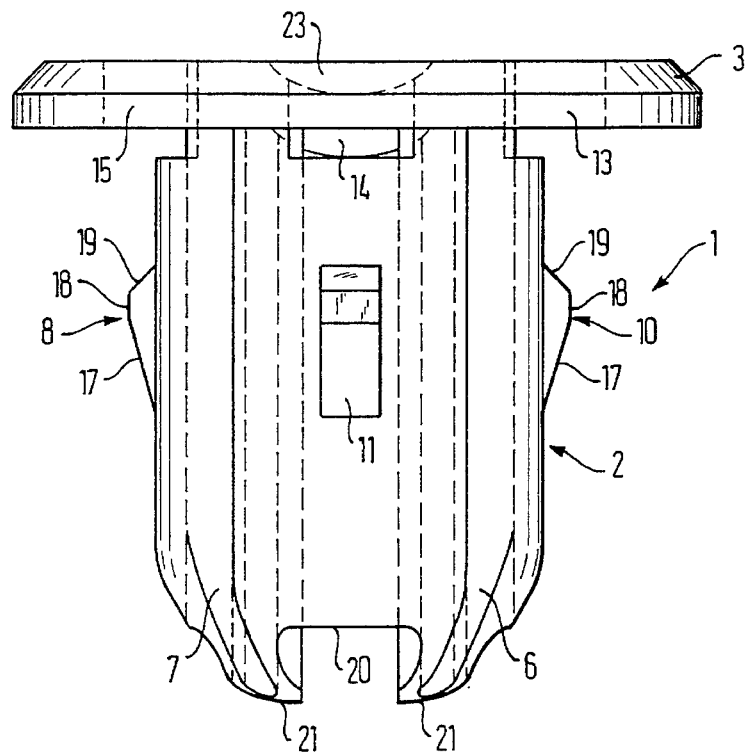
FIG. 4 is a front view of the retainer plug of FIG. 1.

One can specifically see from FIGS. 1 and 4 that the open lower end of the basic body is designed with a conically tapered shape whereby the end areas 21 of the pleat-like, pulled-in areas 4, 5, 6, and 7 project beyond the end areas 20 of the smooth circumference 22 of the basic body 2.

It can be seen from FIG. 5 that the respective area of the smooth circumference 22 of the basic body 2 is larger than the width of the adjacent, pleat-like, pulled-in area 4, 5, 6, and 7. The respective stop element 8, 9, 10, and 11 is arranged in the center of the respective area of the smooth circumference 22 of basic body 2.

Figure 2:
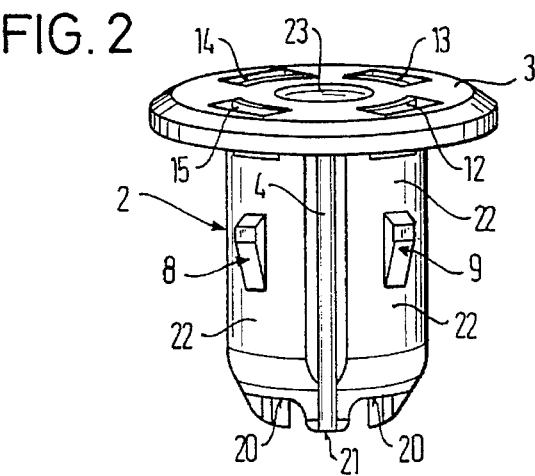
FIG. 2 is a perspective lateral view of the retainer plug of FIG. 1.

The cover flange 3, as seen in FIGS. 1, 2, and 4, has a dish-like pulled-in area 23 located centrally on the top which results in an additional improvement of the flexibility of the retainer plug 1, according to the invention. Alternatively, the possibility also exists that there can be arranged, above the cover flange 3, at least one fastening element (not shown), such as a cable tape, a cable holder, or a clip, which is to be joined with another element such as a full line wiring bundle, cable, or some element to be supported and/or held relative to the support.

In the second embodiment according to FIGS. 6–9, the pleat-like, pulled-in areas of the basic body 2' are designed as open, axially extending recesses 30, 31, 32, and 33 distributed over the circumference. The recesses are separated from each other by walls 35, 36, 37, and 38. The walls 35 to 38 are connected with each other in the central area via a central piece 39.

Stop elements 8' and 9' according to FIG. 8, again have a cross-piece-like shape with a starting ramp 19, a middle area 18 that extends generally parallel to the basic body 2', and with a stop ramp 19 facing the underside of the cover flange 3'. The basic body 2' is connected with the cover flange 3' via cross-pieces 40, 41, 42, and 43. This again results in excellent elasticity of the basic body 2, which facilitates insertion in a support aperture (not shown).

In the embodiment presented in FIGS. 6 to 9, the stop elements 8', 9' are arranged on the circumference of the basic body at staggered distances from the cover flange. In such arrangement, each two stop elements 8', 9' are arranged on both sides of a slot 51, 52, 53, and 54 connected with the open recesses 30, 31, 32, and 33. As a result of such staggering of the stop elements 8', 9', the possibility exists of arranging the retainer plug according to the invention in support apertures exhibiting different thicknesses. Moreover, excellent tolerance compensation is guaranteed.

In one alternative embodiment (not illustrated), the possibility also exists that above the cover flange there can be arranged at least one attachment element, and/or a cable tape, a cable holder or a clip, which is to be joined with another element.

In the embodiment according to FIGS. 6–9, the pleat-like, pulled-in areas of the basic body 2' are designed as axially extending, open recesses 30, 31, 32, and 33 that are distributed about the circumference and separated from each other by walls. These walls are connected with each other in the middle area of the body via a central piece 39.

The stop elements 8' and 9' according to FIG. 8, again exhibit a cross-piece-like shape with a starting ramp 19, a middle area 18 that extends generally parallel to the basic body 2, and a stop ramp 17 facing the underside of the cover flange 3'. The basic body 2' is connected via cross-pieces 40, 41, 42, and 43 with cover flange 3'. This again results in excellent elasticity of the basic body 2' to facilitate installation in a support aperture (not shown).

In the embodiment represented in FIGS. 6 to 9, the stop elements 8', 9' are arranged on the circumference of the basic body at staggered distances from the cover flange. In this arrangement, each two stop elements 8', 9' are arranged on both sides of a slot connected with the open recesses 30, 31, 32, and 33. Because of such staggering in location of the stop elements 8', 9', the possibility exists of arranging the retainer plug according to the invention in support apertures which exhibit different thicknesses. Moreover, excellent tolerance compensation is guaranteed.

In a further embodiment, the possibility also exists of providing, instead of the two stop elements 8', 9' staggered in location, additional stop elements at the four circumferential areas 60 of the basic body 2. These circumferential areas 60 are respectively again separated from each other via slots 51, 52, 53, and 54.

In yet another unillustrated embodiment, the individual stop elements can also exhibit a thread-like incline or spiral-like location relative to one another in order to hereby guarantee improved adaptation capability to various support thicknesses. Instead of the arrangement of stop elements 8' and 9' represented in FIGS. 6 to 9, there also exists the possibility of arranging all stop elements on one distance from the cover flange, whereby such arrangement can then only be used for one support thickness.

Figure 6:
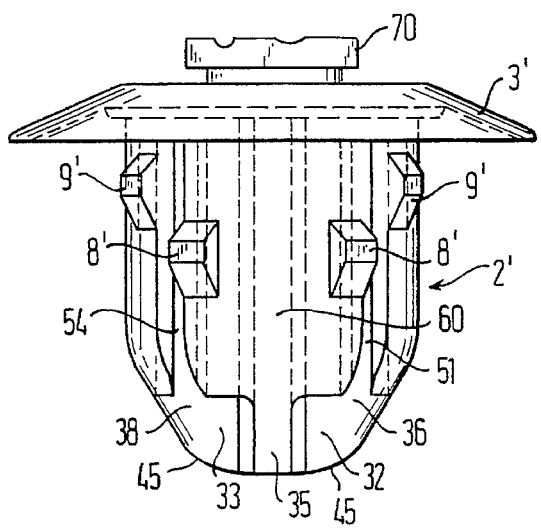
FIG. 6 is a side view of a second embodiment of the invention.
Figure 7:
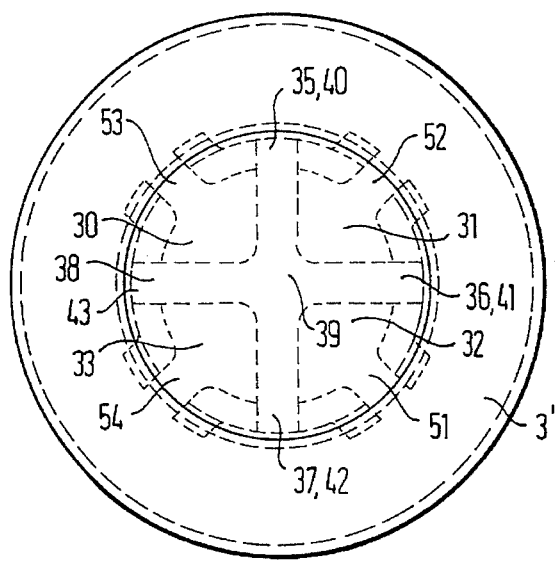
FIG. 7 is a top plan view of the embodiment of FIG. 6.
Figures 8, 9:
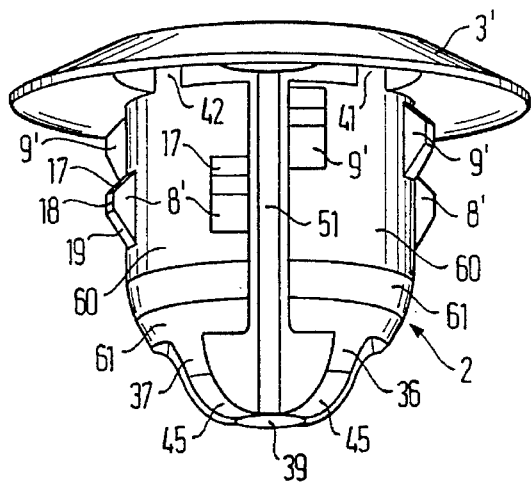
FIGS. 8 and 9 are perspective views of the embodiment of FIG. 6.

It is specifically evident from FIGS. 6 and 8 that the central piece 39 and the walls 35, 36, 37, and 38 frontally project from the basic body 2'. The walls are respectively equipped with tapered insertion areas 45 leading to the central piece 39. These insertion areas 45, designed either conically or arched, result, with cone area 61, in excellent centering during installation of the retainer plug according to the invention. However, the central piece 39 provides the entire basic body with a great degree of ruggedness.

The cover flange is, in turn, equipped with a circumferential, known per se, sealing lip. On the upper side of the cover flange, there can be arranged a holding element, known per se, for example a cable holder 70.

As a result of the unique design of the retainer plug, according to the invention, there is produced a simplification and facilitation of installation with secure attachment within at least one support aperture between the underside of the cover flange 3 or 3' and the obliquely extending stop ramp 17 of the respective stop elements 8, 9, 10, 11 or 8' and 9'. Installation in the respective support aperture is guaranteed by the conical shape of the open end of the basic body 2 or 2'. Thus, the retainer plug according to the invention can easily be installed in an aperture of a support or in at least two concentrically superposed apertures of supports and produce there functionally secure fastening.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. In a retainer plug formed of plastic and having an elongated bolt-like basic body and a radially extending cover flange, the basic body including a radially outwardly facing wall, at least two longitudinally extending pleat-like, pulled-in areas, stop elements arranged on the outwardly facing wall of the basic body at locations longitudinally spaced from the cover flange and between the pleat-like pulled-in areas, the improvement wherein the basic body (2) has an open end opposite the cover flange (3) and the stop elements are shaped to include a starting ramp (17), a middle area (18) that essentially extends parallel to the basic body (2), and a stop ramp (19) facing the underside of the cover flange (3), and wherein the cover flange (3) is provided with recesses (12, 13, 14, 15), each said recess associated with a stop element, the recesses having a circumferential width (B) and arranged to extend downwardly through the wall (16) of the basic body (2) to a point below the cover flange (3).

2. A retainer plug according to claim 1 wherein the axial depth (T) of the recesses (12, 13, 14, 15) is less than the distance (A) between the cover flange (3) and the associated stop ramp (19).

3. A retainer plug according to claim 1 wherein the circumferential width (B) of each recess (12, 13, 14, 15) is greater than the width (b) of the associated stop element (8, 9, 10, 11).

4. A retainer plug according to claim 1 wherein the basic body (2) is cylindrical and has four circumferentially spaced pleat-like, pulled-in areas (4, 5, 6, 7), between which are located the stop elements (8, 9, 10, 11).

5. A retainer plug according to claim 1 wherein the pleat-like, pulled-in areas (4, 5, 6, 7) have a "U" shape.

6. A retainer plug according to claim 1 wherein the open end of the basic body (2) has a conically tapered shape.

7. A retainer plug according to claim 1 wherein the basic body has portions of smooth outer circumference (22) adjacent the pleat-like, pulled-in areas (4, 5, 6, 7), the widths of the portions of smooth outer circumference being greater than the widths of the adjacent pleat-like pulled-in areas.

8. A retainer plug according to claim 7 wherein each stop element (8, 9, 10, 11) is arranged in the center of a respective area of smooth outer circumference (22) of the basic body (2).

9. A retainer plug according to claim 1 wherein the cover flange (3) has an end surface with a depressed central area (23).

* * * * *